J. J. PATTON.
TIRE.
APPLICATION FILED JAN. 24, 1911.
998,980.
Patented July 25, 1911.
2 SHEETS—SHEET 1.
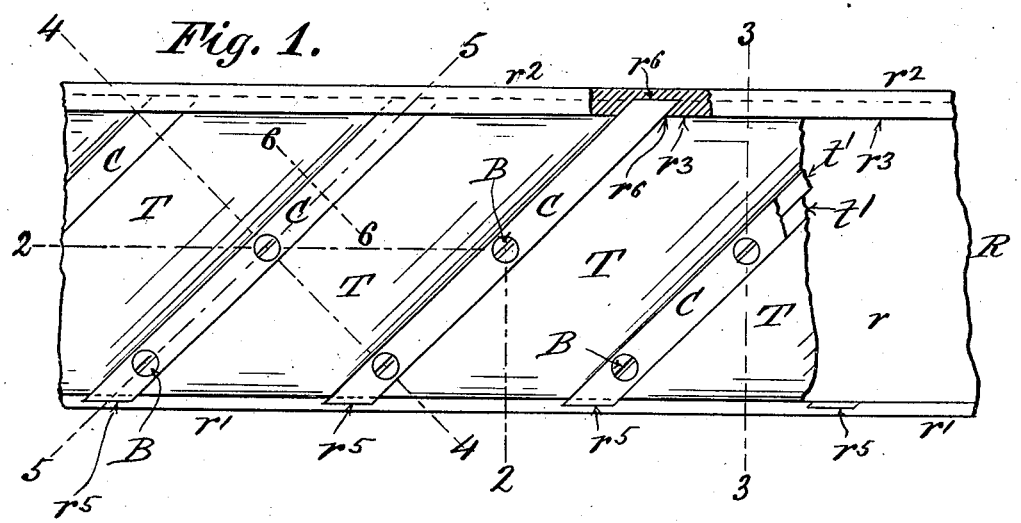
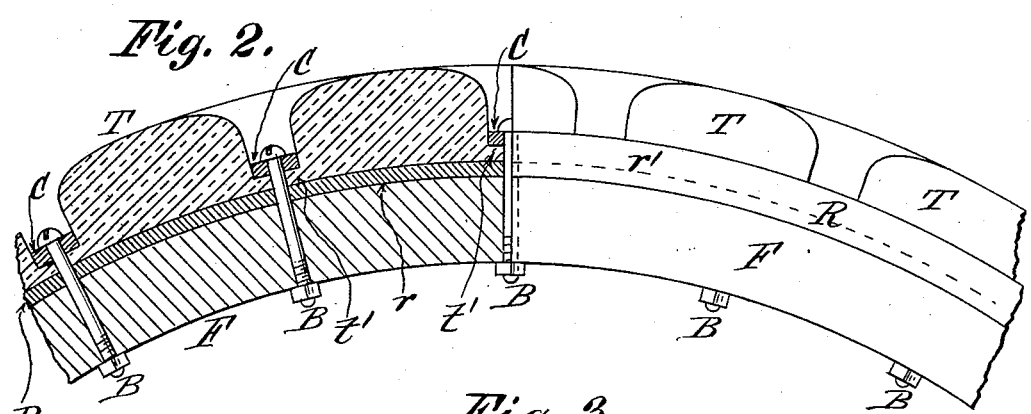
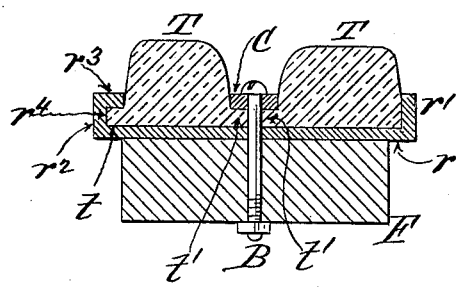
Witnesses:
Lillia Miatt
P. E. Schrell
Inventor:
John J. Patton
By his Attorney
Geo. W. Miatt
COLUMBIA PLANOGRAPH CO., WASHINGTON, D. C.

J. J. PATTON.
TIRE.
APPLICATION FILED JAN. 24, 1911.
998,980.
Patented July 25, 1911.
2 SHEETS—SHEET 2.
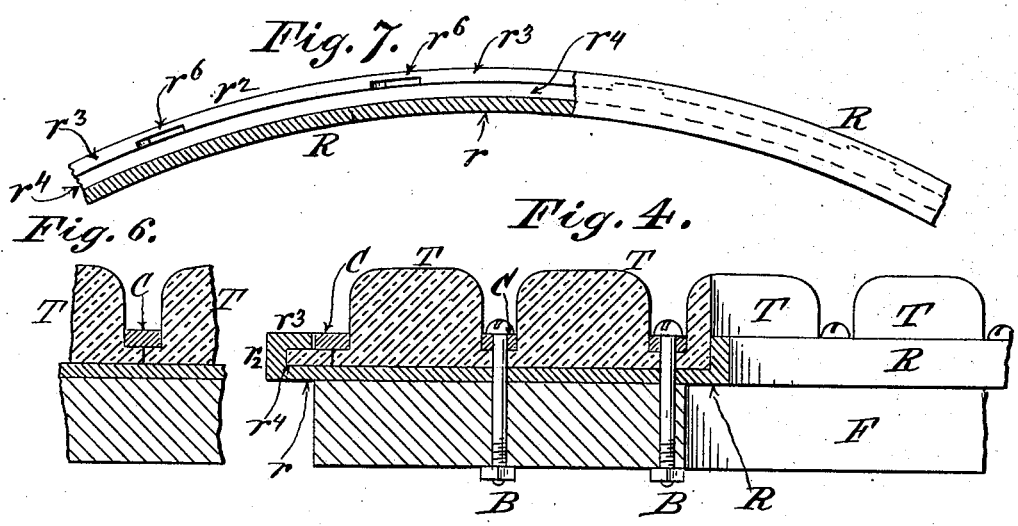
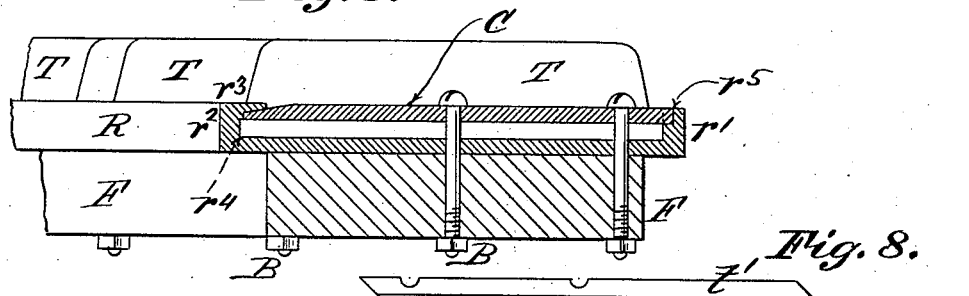
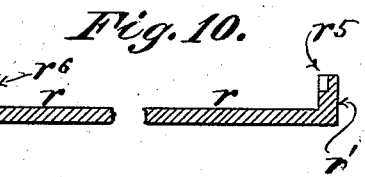

UNITED STATES PATENT OFFICE.

JOHN J. PATTON, OF NEW YORK, N. Y.

TIRE.

998,980. Specification of Letters Patent. Patented July 25, 1911.

Application filed January 24, 1911. Serial No. 604,311.

*To all whom it may concern:*

Be it known that I, JOHN J. PATTON, a citizen of the United States, residing in the borough of Manhattan, city, county, and State of New York, have invented certain new and useful Improvements in Tires, of which the following is a specification.

The main object of my invention is to attain an anti-skid tire of exceptional simplicity, strength, durability and efficiency, especially adapted to the requirements of heavy traction vehicles such as automobiles and vehicles designed for commercial transportation, although the tire is also applicable for general use.

The present invention relates to improvements on the tire shown and described in Letters Patent issued to me Dec. 27, 1910, No. 979,882, in which the distinguishing feature is the use of elastic resilient tread sections arranged diagonally in channels across the periphery of an annular rim shrunk onto the felly of the wheel.

In the present case I dispense with the diagonal ribs on the rim, as well as with the circumferential side plates, thereby simplifying and cheapening the structure, and use a one piece, shrunk-on rim formed with side flanges, between which the diagonally arranged elastic resilient tread sections are seated, and diagonal cap plates the ends of which fit in recesses formed for their reception in the side flanges of the rim, as hereinafter fully set forth, the invention consisting in the specific construction and arrangement of parts described and claimed.

In the accompanying drawings, Figure 1, is an elevation of a portion of the face of my improved tire spread out horizontally for convenience of illustration, parts being also broken away, to more clearly show the structure; Fig. 2, is a sectional side elevation of a portion of the tire, the sectional half being taken on the rectangular line 2—2 Fig. 1; Fig. 3, is a transverse section taken upon plane of line 3—3 Fig. 1; Fig. 4, is a diagonal section taken upon plane of line 4—4 Fig. 1; Fig. 5, is a diagonal section taken upon plane of line 5—5 Fig. 1; Fig. 6, is a sectional detail taken upon plane of line 6—6 Fig. 1; Fig. 7, is a sectional elevation of a portion of the rim alone; Fig. 8 is a top view of one of the diagonal treads; Fig. 9, is an elevation of my one piece rim on a reduced scale; Fig. 10, is a sectional view of the rim (broken away centrally) taken upon the same plane as Fig. 5, and showing the recesses in the side flanges for the ends of the cap plates.

In the sectional views, Figs. 4 and 5, the projection of the sides of the tire are, for convenience, shown straight as in Fig. 1, instead of following the curve of the tire.

F, represents the felly of the wheel onto which my annular, one piece metallic rim R, is shrunk.

The rim R, consists of the base plate $r$, formed with the side flanges $r'$, $r^2$, integral therewith. One of these side flanges, $r^2$, is formed with an inturned lip $r^3$, forming an annular internal recess $r^4$, in which the flanged ends $t$, of the diagonal elastic resilient tread sections T, fit. The other side flange $r'$, is straight, and is formed with recesses $r^5$, for the reception of the ends of the diagonal cap plates C. These recesses $r^5$, are on the inner side of the flange $r'$, and extend through the outer edge thereof, to admit of the insertion of these ends of the cap plates C, which ends are rectangular and of full thickness,—the sides of the recesses $r^5$, reinforcing and supporting these ends of the cap plates C, laterally. In a somewhat similar manner the under side of the inturned lip $r^3$, is formed with recesses $r^6$, (see more particularly Fig. 10) for the reception of the other extremities of the cap plates C,—these ends thereof being reduced in thickness for the purpose. In this case the recesses $r^6$, not only reinforce and sustain the ends of the cap plates laterally, but they also confine and hold them down in position so that screw bolts are not requisite on that side of the tire.

The threads T, are formed of elastic resilient material, and in addition to the end flange $t$, hereinbefore referred to, each tread is also formed with longitudinal side base flanges $t'$, $t'$, of one-half the width of the cap plates C, which latter over-lap the said longitudinal flanges of adjoining treads when the parts are assembled.

One or more screw bolts B, are used to secure each cap plate C, in position and bind the longitudinal flanges $t'$, of the tread bases firmly against the rim plate $r$. In the construction shown in the drawings one central bolt, and one end bolt are used for each cap plate C,—the other end of the cap plate being secured by the inturned lip $r^3$, of the side flange $r^2$, as hereinbefore described.

The rigid side flanges $r'$, $r^2$, with their recesses $r^5$, $r^6$, by sustaining the cap plates against displacement, effectually prevent the "creeping" of the treads, which was the main function of the diagonal ribs to which the cap plates were attached, as in my patent hereinbefore cited. By thus dispensing with said diagonal ribs, and with the circumferential side plates used in connection therewith, I materially reduce the number of parts, and attain a substantial, durable structure.

What I claim as my invention and desire to secure by Letters Patent is,

1. A wheel tire of the character designated comprising a continuous one piece rolled annular metallic rim shrunk onto the felly of a wheel and consisting of a base plate formed integrally with out-turned side flanges which are recessed on their inner sides to receive the ends of diagonal cap plates, said cap plates, diagonal elastic resilient treads seated on the base plate of the rim between its side flanges and formed with longitudinal base flanges, and bolts securing the said diagonal cap plates in position overlapping the adjoining longitudinal flanges on the said diagonal treads for the purpose described.

2. A wheel tire of the character designated comprising a continuous one piece rolled annular metallic rim shrunk onto the felly of a wheel and consisting of a base plate formed integrally with out-turned side flanges which are recessed on their inner sides to receive the ends of diagonal cap plates, one of said side flanges being also formed with an inturned annular lip forming an annular groove on that side of the rim, diagonal elastic resilient treads seated on the base plate of the rim and formed with end base flanges fitting in said annular side groove of the rim and with longitudinal side base flanges, said diagonal cap plates fitting over the longitudinal side base flanges of the treads, and into the recesses in the side flanges of the rim, and bolts securing the said diagonal cap plates in position for the purpose described.

JOHN J. PATTON.

Witnesses:
GEO. WM. MIATT,
LILLIA MIATT.

---

Copies of this patent may be obtained for five cents each, by addressing the "Commissioner of Patents, Washington, D. C."